(12) United States Patent
Yamazaki

(10) Patent No.: US 8,714,468 B2
(45) Date of Patent: May 6, 2014

(54) PLASTIC SCRAP CRUSHING APPARATUS

(71) Applicant: Sumio Yamazaki, Nagano (JP)

(72) Inventor: Sumio Yamazaki, Nagano (JP)

( * ) Notice: Subject to any disclaimer, the term of this patent is extended or adjusted under 35 U.S.C. 154(b) by 59 days.

(21) Appl. No.: 13/670,081

(22) Filed: Nov. 6, 2012

(65) Prior Publication Data
US 2014/0027548 A1    Jan. 30, 2014

(30) Foreign Application Priority Data

Jul. 24, 2012 (JP) ................................ 2012-163346

(51) Int. Cl.
*B02C 21/00* (2006.01)
*B02C 19/22* (2006.01)

(52) U.S. Cl.
USPC ........... 241/65; 241/260.1; 241/222; 241/243

(58) Field of Classification Search
USPC .......................... 241/65, 260.1, 222, 243, 246
See application file for complete search history.

(56) References Cited

U.S. PATENT DOCUMENTS

| | | | | |
|---|---|---|---|---|
| 5,232,170 A | * | 8/1993 | Yang ............................ | 241/260.1 |
| 5,397,065 A | * | 3/1995 | Shutov et al. ................... | 241/16 |
| 5,526,991 A | * | 6/1996 | Bacher et al. .................. | 241/65 |
| 5,743,471 A | * | 4/1998 | Ivanov ............................ | 241/16 |
| 6,325,307 B1 | * | 12/2001 | Nikolskii et al. ................ | 241/23 |
| 6,702,211 B2 | * | 3/2004 | Yamamoto ....................... | 241/65 |
| 7,648,358 B1 | | 1/2010 | Yamazaki | |
| 2002/0125352 A1 | * | 9/2002 | Ivanov et al. ................... | 241/23 |

FOREIGN PATENT DOCUMENTS

| | | |
|---|---|---|
| JP | H07507730 | 8/1995 |
| JP | 2009039871 | 2/2009 |

\* cited by examiner

*Primary Examiner* — Faye Francis
(74) *Attorney, Agent, or Firm* — Muncy, Geissler, Olds & Lowe, P.C.

(57) ABSTRACT

The plastic scrap extruding apparatus has a simple structure and is capable of suitably crushing plastic scraps and sending them to a heating cylinder 10. The extruding apparatus comprises: a housing 12 holding a rear part of the heating cylinder 10 and having a material inlet 13; a large rotary blade 20 for crushing the plastic materials and rotatable with a screw 11; small rotary blades 21, 22 being located on the axially front and rear sides of the large rotary blade 20 and rotatable with the large rotary blade 20; and a fixed blade 30 being fixed to the housing 12 and capable of working with the rotary blades. A large rotary blade 20 passable groove 40, through which the large rotary blade 20 can be rotated, is formed in a lower part of the housing 12.

5 Claims, 3 Drawing Sheets

PLASTIC SCRAP CRUSHING APPARATUS

CROSS-REFERENCE TO RELATED APPLICATION

This application is based upon and claims the benefit of priority of the prior Japanese Patent Application No. P2012-163346, filed on Jul. 24, 2012 and the entire contents of which are incorporated herein by reference.

BACKGROUND OF THE INVENTION

The present invention relates to a plastic scrap extruding apparatus, which is a component of a plastic pellet forming equipment for reproducing plastic pellets from plastic scraps, e.g., sprues and runners formed by injection molding, fins formed by blow molding, and which is capable of plasticizing and extruding the plasticized scraps.

Conventionally, in injection molding plants, plastic scraps, e.g., sprues, runners, fins, are crushed, and the crushed materials are mixed with new materials to reuse. Molding must be stably performed with using the mixed materials, but using the mixed materials causes some problems, e.g., forming powders of the crushed materials, reproduced pellets having different sizes, non-uniform mixture of the reproduced pellets and new pellets. To solve the above described problems, the reproduced pellets whose size and shape are equal to those of new pellets must be produced by a plastic pellet forming equipment, and a compact pellet forming equipment is required.

Conventional pellet forming equipments have following problems, so they have not been popularized.

Firstly, a general extruding apparatus of the conventional pellet forming equipment has a material tank, which is provided in a material supplying section. In case of using this extruding apparatus of the pellet forming equipment, plastic scraps which have been discharged from a molding machine at regular intervals are once crushed by a crusher, and then the crushed scraps are transferred to the material tank as crushed materials. Therefore, the transferring step is troublesome, and there is a possibility that foreign matters invade into the crushed materials in the transferring step.

The crushed materials are tended to be left in the air, so some crushed materials absorb moisture from the air. If the crushed materials absorb moisture, the crushed materials cannot be used, for forming pellets, without being dried.

Further, it is required that the crushed materials have the size and shape which can be received by an extruding screw. But, the crusher is designed on the basis that the crushed materials are mixed with new materials. Therefore, the crusher has a complex structure, and a production cost of the crusher must be increased.

To solve the above described problems, a new extruding apparatus was proposed (see page 1 of Japanese Laid-open Patent Publication No. 2009-39871). In the apparatus, the step of crushing plastic scraps, which have been discharged from a molding machine, is omitted, the plastic scraps are crushed by a drawing section of an extruding screw, and the crushed scraps are conveyed to a plasticizing section of the extruding screw.

However, in the extruding apparatus, treatable scraps are limited to small scraps, e.g., sprues formed while producing CDs and DVDs, whose size is nearly equal to an outer diameter of the extruding screw. Therefore, general large plastic scraps cannot be treated.

Further, another new extruding apparatus, which can treat large scraps, was proposed (see page 1 of Japanese Translation PCT Publication No. 07-507730). In the apparatus, a two-shaft shredder is assembled so as to crush large plastic scraps.

However, in the apparatus, a conventional crusher is merely assembled to a material supply section of the conventional extruding apparatus. The extruding screw and the crusher are driven by separate driving mechanisms, and a structure of a rotary blade is complicated. Further, a large amount of scraps can be effectively treated at a time, but scraps, which have been discharged from a molding machine at regular time intervals (e.g., 20-30 seconds mostly), are treated one by one. The structure of the apparatus is complicated and a production cost thereof is high in regard to the function.

Namely, the problems of the conventional extruding apparatuses are that plastic materials produced by crushing plastic scraps cannot be suitably sent to a heating cylinder, that the structures are complicated and that their production costs must be high.

SUMMARY OF THE INVENTION

Accordingly, it is an object to provide a plastic scrap extruding apparatus capable of solving the above described problems of the conventional technologies. Namely, the plastic scrap extruding apparatus of the present invention has a simple structure and is capable of suitably crushing plastic scraps and sending them to a heating cylinder. Further, a production cost can be reduced.

To achieve the object, the present invention has following structures.

Namely, the plastic scrap extruding apparatus of the present invention comprises:

a heating cylinder for heating plastic materials and guiding the heated plastic materials forward;

a screw for sending the heated plastic materials forward;

a housing holding a rear part of the heating cylinder and having a plastic material inlet;

a large rotary blade being provided in the housing so as to crush the plastic materials which have been supplied into the housing, the large rotary blade being concentrically integrated and rotatable with the screw;

small rotary blades being provided in the housing and respectively located on the axially front side and the axially rear side of the large rotary blade, the small rotary blades being concentrically integrated and rotatable with the large rotary blade; and a fixed blade being fixed to the housing and capable of working with the large rotary blade and the small rotary blades, a large rotary blade passable groove, through which the large rotary blade can be rotated, is formed in a lower part of the housing other than at least an upper part thereof to which the plastic materials are supplied, and the crushed plastic materials are scooped up when the large rotary blade passes through the large rotary blade passable groove.

Preferably, the shape of the large rotary blade, seen from the axial direction thereof, is formed into an S-shape, two concave parts of the S-shape act as blade sections, and each of the blade sections includes: a blade in which the side opposite to the heating cylinder side is sharp-set; and an inclined face, which is formed on the heating cylinder side so as to send the crushed plastic materials forward.

Preferably, step-shaped small rotary blade passable grooves, through which the small rotary blades can be respectively rotated, are formed in the lower part of the housing other than at least the upper part thereof to which the plastic materials are supplied, and they are located on the axially front side and the axially rear side of the large rotary blade passable groove, and the small rotary blade passable grooves respectively have slope parts which constitute tapered faces, whose separation is gradually decreased with distance from the large rotary blade, so as to introduce the crushed plastic materials into the large rotary blade passable groove.

Preferably, the plastic material inlet is located close to the rear end of the housing so as not to move the plastic materials toward the heating cylinder before the plastic materials are crushed.

Preferably, a blade section of the small rotary blade located on the heating cylinder side has an inclined face, which is formed on the heating cylinder side, so as to send the crushed plastic materials forward.

By employing the plastic scrap extruding apparatus of the present invention, the structure of the apparatus can be simple, a production cost of the apparatus can be reduced, and plastic scraps can be suitably crushed and sent to the heating cylinder.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Figure 1:
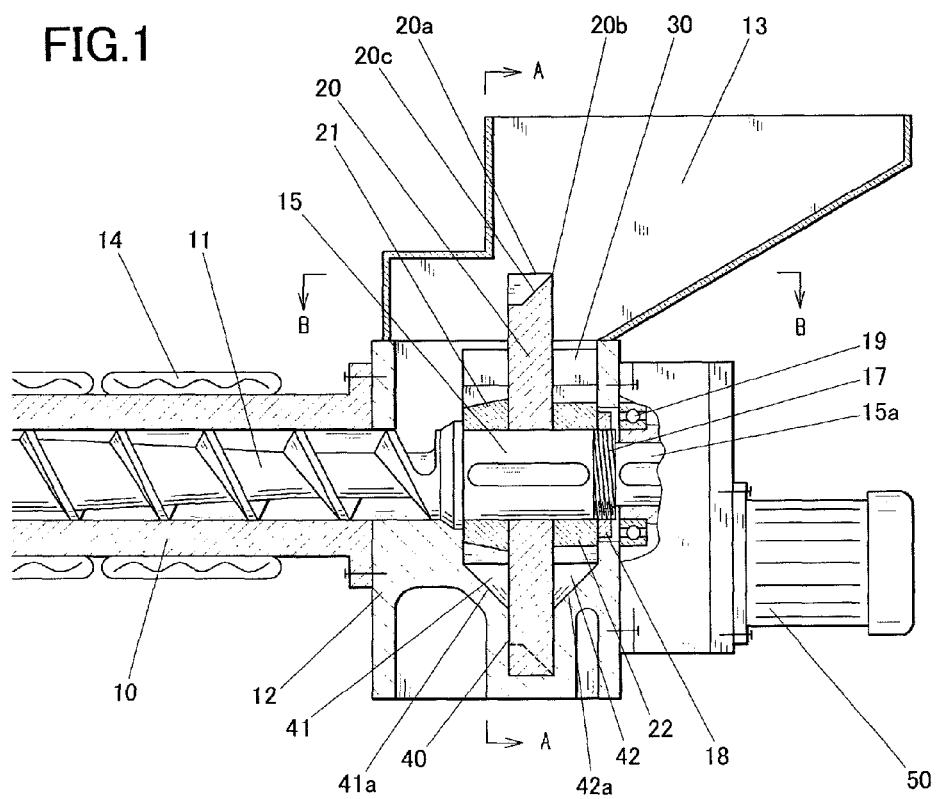
FIG. 1 is a sectional view of a plastic scrap extruding apparatus relating to the present invention.
Figure 2:
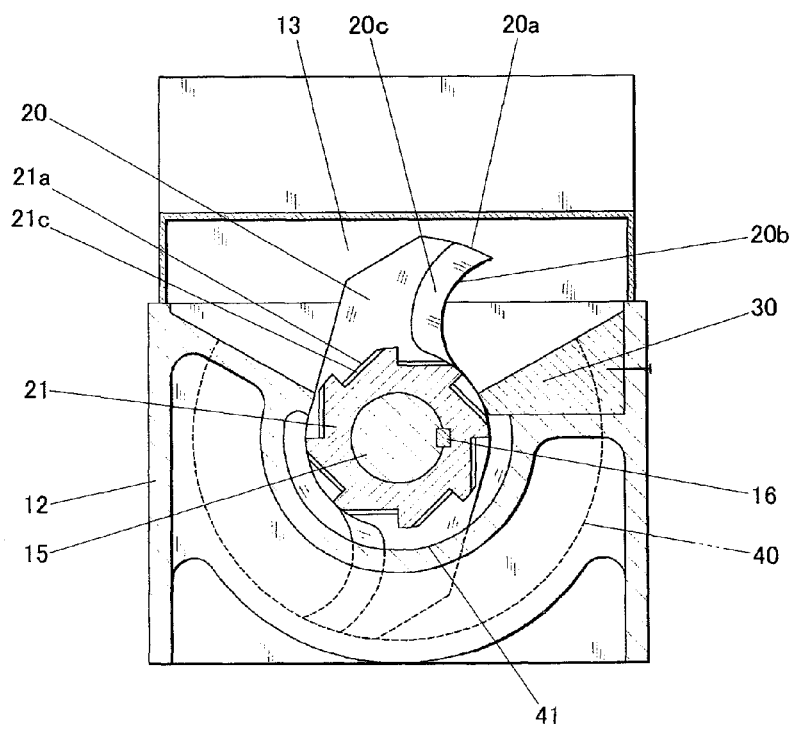
FIG. 2 is a sectional view taken along a line A-A shown in FIG. 1.
Figure 3:
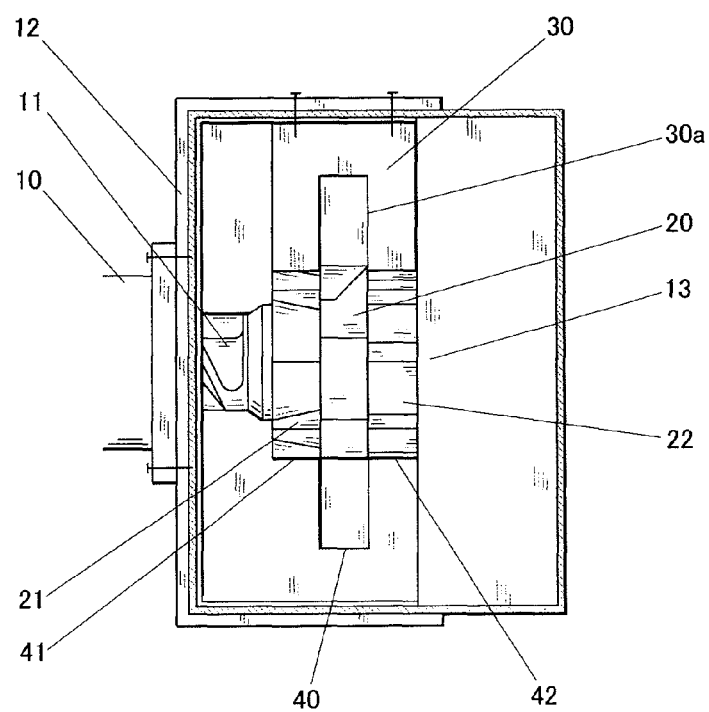
FIG. 3 is a sectional view taken along a line B-B shown in FIG. 1.

Preferred embodiments of the present invention will now be described in detail with reference to the accompanying drawings (FIGS. 1-3).

The plastic scrap extruding apparatus includes a heating cylinder 10, which heats plastic scraps and acts as a passage way for sending the plastic scraps forward, and a screw 11, which is rotated in the heating cylinder 10 so as to send the plastic scraps forward. A band heater 14 is wound on an outer circumferential face of the heating cylinder 10 so as to heat the heating cylinder 10.

A housing 12 holds a rear part of the heating cylinder 10 and having a plastic material inlet 13. A large rotary blade 20, which crushes the plastic materials supplied into the housing 12 and which is concentrically integrated and rotated with the screw 11, small rotary blades 21 and 22, which are respectively located on the axially front side and the axially rear side of the large rotary blade 20 and which are concentrically integrated and rotated with the large rotary blade 20, and a fixed blade 30, which is fixed to the housing 12 and capable of working with the large rotary blade 20 and the small rotary blades 21 and 22, are provided in the housing 12.

The rotary blades 20, 21 and 22, which are concentrically integrated with the screw 11, will be explained. The front small rotary blade 21, the large rotary blade 20 and the rear small rotary blade 22 are integrally fixed to a shaft section 15, which is extended from a rear end of the screw 11, in that order, by a key (see FIG. 2) and a nut 18 screwed with a male screw part 17 of the shaft section 15. A rear end 15a of the shaft section 15 is rotatably held by a bearing 19 which is held by the housing 12.

In the present embodiment, a gear is attached to the rear end 15a of the shaft section 15, and the screw 11 and the rotary blades 20, 21 and 22, which are integrated with the shaft section 15, are rotated by a geared motor 50. Note that, the driving means is not limited to the present embodiment, so other known driving means may be suitably selected.

A large rotary blade passable groove 40, through which the large rotary blade 20 can be rotated, is formed in a lower part of the housing 12 other than at least an upper part thereof to which the plastic materials are supplied. The large rotary blade passable groove 40 is formed along a rotational track of the large rotary blade 20, and a width of the large rotary blade passable groove 40 corresponds to that of the large rotary blade passable groove 40. The crushed plastic materials can be scooped up when the large rotary blade 20 passes through the large rotary blade passable groove 40.

In the present embodiment, as shown in FIG. 3, the large rotary blade passable groove 40 is circularly formed other than the material inlet 13, and the center angle of the large rotary blade passable groove 40 is more than 180 degrees. Further, small rotary blade passable grooves 41 and 42 are circularly formed and their center angles are more than 180 degrees as well as the large rotary blade passable groove 40. With the above described structure, crushed scraps can be suitably scooped up and sent toward the heating cylinder 10.

The extruding apparatus of the present embodiment, which has the simple structure, can be produced with a low production cost. The plastic scraps can be continuously crushed in the housing 12, and the crushed scraps can be continuously sent toward the heating cylinder 10. The crushed scraps, which have been sent to the heating cylinder 10, can be suitably sent, through the heating cylinder 10, by the screw 11. In the present embodiment, diameters of the large rotary blade and the small rotary blades 21 and 22 are greater than that of the screw 11, and their rotational axes are horizontally arranged. Therefore, the crushing step and the extruding step can be suitably performed by suitably acting the gravitational force thereon. Note that, the small rotary blades 21 and 22 have the same diameter.

The present invention is not limited to the above described structure. For example, the angles of the rotational axes may be suitably varied, and the diameters of the small rotary blades 21 and 22 may be suitably designed. The angles, the diameters, etc. may be optionally changed according to shapes, qualities, amounts, etc. of the plastic scraps.

The large rotary blade 20 mainly cuts and crushes large scraps (plastic materials). On the other hand, the small rotary blades 21 and 22 crush the plastic materials, which have been cut and crushed by the large rotary blade 40, to the prescribed size so as to send them to the heating cylinder 10. By supplying the large scraps continuously, crushed scraps which have the prescribed size can be automatically and continuously produced.

Note that, if the supplied plastic scraps (plastic materials) are smaller than the rotary blades 20, 21 and 22 or the supplied plastic scraps have sizes smaller than the prescribed size, most of the plastic scraps are not crushed and they fall into the large rotary blade passable groove 40. The plastic scraps in the large rotary blade passable groove 40 are scooped up by the large rotary blade 20 and sent toward the heating cylinder 10.

In the present embodiment, the shape of the large rotary blade 20, seen from the axial direction thereof, is formed into an S-shape. Two concave parts of the S-shape act as blade sections 20a. Each of the blade sections 20a includes: an edge 20b in which the side opposite to the heating cylinder 10 side is sharp-set; and an inclined face 20c, which is formed on the heating cylinder 10 side so as to send the crushed plastic materials forward.

By rotating the large rotary blade 20, the crushed plastic materials are scooped up and roll down, on the inclined face 20c which is inclined toward the front side of the blade section 20a, toward the heating cylinder 10, so that the crushed plastic materials can be efficiently sent.

In the present embodiment, step-shaped small rotary blade passable grooves 41 and 42, through which the small rotary blades 21 and 22 can be respectively rotated, are formed in the lower part of the housing 12 other than at least the upper part thereof to which the plastic materials are supplied, and they are located on the axially front side and the axially rear side of the large rotary blade passable groove 40. The small rotary blade passable grooves 41 and 42 respectively have slope parts which constitute tapered faces 41a and 42a, whose separation is gradually decreased with distance from the large rotary blade 20, so as to introduce the crushed plastic materials into the large rotary blade passable groove 40.

With this structure, the crushed plastic materials smoothly deposit in the large rotary blade passable groove 40, and they can be efficiently scooped up by the large rotary blade 20. Therefore, the crushed plastic materials can be suitably sent toward the heating cylinder 10.

Note that, the fixed blade 30 is formed into a U-shape. When the large rotary blade 20 rotates, the large rotary blade 20 fits and frictions the U-shaped fixed blade 30. The plastic scraps are cut and crushed between the edges 20b and inner edges 30a of the U-shaped fixed blade 30 (see FIG. 3).

In the present embodiment, the plastic material inlet 13 is located close to the rear end of the housing 12 so as to restrain the plastic materials to move toward the heating cylinder 10 before the plastic materials are crushed. Namely, a distance between the large rotary blade 20 and the front end of the housing 12 is made short, so that large plastic materials are prohibited to enter the heating cylinder 10.

With this structure, a part of the material inlet 13 which is located on the rear side of the large rotary blade 20, is widely opened, so that large plastic scraps (materials) can be securely and smoothly cut and crushed, by the large rotary blade 20, before being sent forward.

In the present embodiment, a blade section 21a of the small rotary blade 21, which is located on the heating cylinder 10 side, has an inclined face 21c, which is formed on the heating cylinder 10 side, so as to send the crushed plastic materials forward.

With this structure, by rotating the small rotary blade 21, the crushed plastic materials are scooped up and roll down, on the inclined face 21c which is inclined toward the front side of the blade section 20a (see FIG. 2), toward the heating cylinder 10, so that the crushed plastic materials can be efficiently sent.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. A plastic scrap crushing apparatus, comprising:
a heating cylinder for heating plastic materials and guiding the heated plastic materials forward;
a screw for sending the heated plastic materials forward;
a housing holding a rear part of the heating cylinder and having a plastic material inlet;
a large rotary blade being provided in the housing so as to crush the plastic materials which have been supplied into the housing, the large rotary blade being concentrically integrated and rotatable with the screw;
small rotary blades being provided in the housing and respectively located on the axially front side and the axially rear side of the large rotary blade, the small rotary blades being concentrically integrated and rotatable with the large rotary blade; and
a fixed blade being fixed to the housing and capable of working with the large rotary blade and the small rotary blades,
wherein a large rotary blade passable groove, through which the large rotary blade can be rotated, is formed in a lower part of the housing other than at least an upper part thereof to which the plastic materials are supplied, and
the crushed plastic materials are scooped up when the large rotary blade passes through the large rotary blade passable groove.

2. The plastic scrap crushing apparatus according to claim 1,
wherein the shape of the large rotary blade, seen from the axial direction thereof, is formed into an S-shape,
two concave parts of the S-shape act as blade sections, and
each of the blade sections includes: an edge in which the side opposite to the heating cylinder side is sharp-set; and an inclined face, which is formed on the heating cylinder side so as to send the crushed plastic materials forward.

3. The plastic scrap crushing apparatus according to claim 1,
wherein step-shaped small rotary blade passable grooves, through which the small rotary blades can be respectively rotated, are formed in the lower part of the housing other than at least the upper part thereof to which the plastic materials are supplied, the small rotary blade passable grooves are located on the axially front side and the axially rear side of the large rotary blade passable groove, and
the small rotary blade passable grooves respectively have slope parts which constitute tapered faces, whose separation is gradually decreased with distance from the large rotary blade, so as to introduce the crushed plastic materials into the large rotary blade passable groove.

4. The plastic scrap crushing apparatus according to claim 1,
wherein the plastic material inlet is located close to the rear end of the housing so as not to move the plastic materials toward the heating cylinder before the plastic materials are crushed.

5. The plastic scrap crushing apparatus according to claim 1,
wherein a blade section of the small rotary blade located on the heating cylinder side has an inclined face, which is formed on the heating cylinder side, so as to send the crushed plastic materials forward.

* * * * *